Oct. 19, 1965  F. BROUWER  3,213,282
PHOTOSENSITIVE LINE TRACING APPARATUS
Filed Oct. 10, 1960  2 Sheets-Sheet 1

INVENTOR
Frans Brouwer

By William J. Newman
ATTORNEY

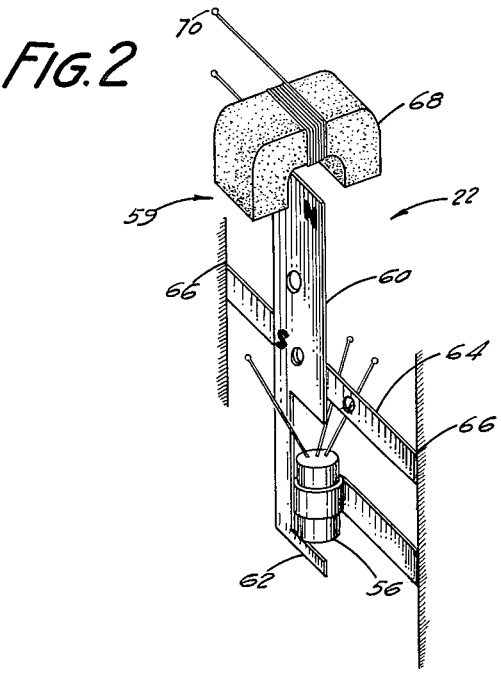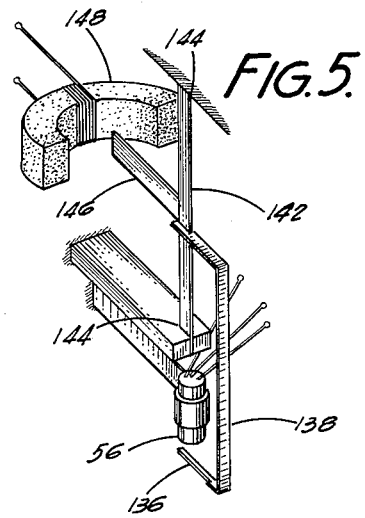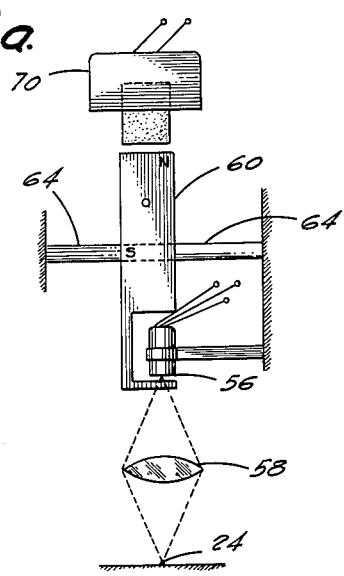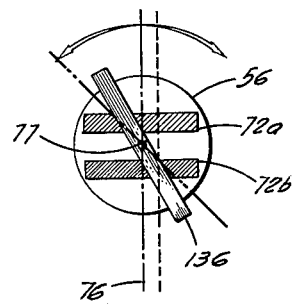

United States Patent Office 3,213,282
Patented Oct. 19, 1965

3,213,282
PHOTOSENSITIVE LINE TRACING APPARATUS
Frans Brouwer, Glencoe, Ill., assignor to Stewart-Warner Corporation, Chicago, Ill., a corporation of Virginia
Filed Oct. 10, 1960, Ser. No. 61,596
14 Claims. (Cl. 250—202)

This invention relates to line sensing devices such as are useful in apparatus to control the pattern of torch cutters, wood sawing machines, clothes cutters, welding tools, milling machines and the like. Representative control devices of this general type may be seen in U.S. Patent 2,489,305, issued November 29, 1949, and in my copending application, Serial No. 56,920 filed September 19, 1960, now Patent No. 3,124,691. More particularly, this invention relates to improvements in guiding elements for such control devices.

In most of the photosensitive type curve followers or line tracing systems employed to date, the electric signal to control the position of the guide element includes only unidirectional information of its deviation in position from the reference pattern. As may be seen in the above-cited prior art, the signal outputs of the photocells in the guide head have positional information only with regard to the transverse deviation of the guide head from the pattern line. An improved system which would have greater accuracy and reliability would be one which would produce control signals which include not only the transverse deviation, but also the angular deviation of a reference line in the guide head with respect to the tangent of the pattern line at the sensed point. The two components of the signal may be made to control the system in two directions which enables it to trace a pattern which closes upon itself without the use of a friction drive steering wheel, as shown in my copending application. It is to this end that this invention is directed.

Therefore, it is an object of this invention to provide a sensing element which has a plurality of variable electrical signal outputs which are dependent on the relative position of a sensed line with respect to a reference line.

It is an object of this invention to provide a sensing element which has an electric signal output which accurately describes the position of the sensing line with respect to a reference line.

It is also an object of this invention to provide a line sensing system which has a simplified construction, a minimum of moving parts and relatively uncomplicated electric circuitry making it economical to construct and maintain.

Other objects and advantages of this invention will be readily apparent upon a further reading of the specification. This invention resides generally in a system for scanning a line having a sensing head which comprises photosensitive means having a plurality of sensitive areas. The sensitive areas are positioned with respect to one another to have an image of a different segment of the line cast simultaneously thereon. Means are provided for periodically obstructing the image of the line segment on each of the areas so that the output of the photosensitives means has a plurality of varying electric signals which are indicative of the position of the line with respect to a reference line.

This invention will be better understood with a further reading of the specification with special reference to the accompanying drawings in which:

FIG. 2 is a schematic drawing in perspective illustrating the sensing head for one embodiment of this invention;

FIG. 2a is an elevattion view of the sensing head of FIG. 2;

FIG. 5 is a schematic in perspective of a sensing head of another embodiment of this invention; and FIG. 6 is a schematic of the photocell and vibrating shutter of the sensing head shown in FIG. 5.

Figure 1:
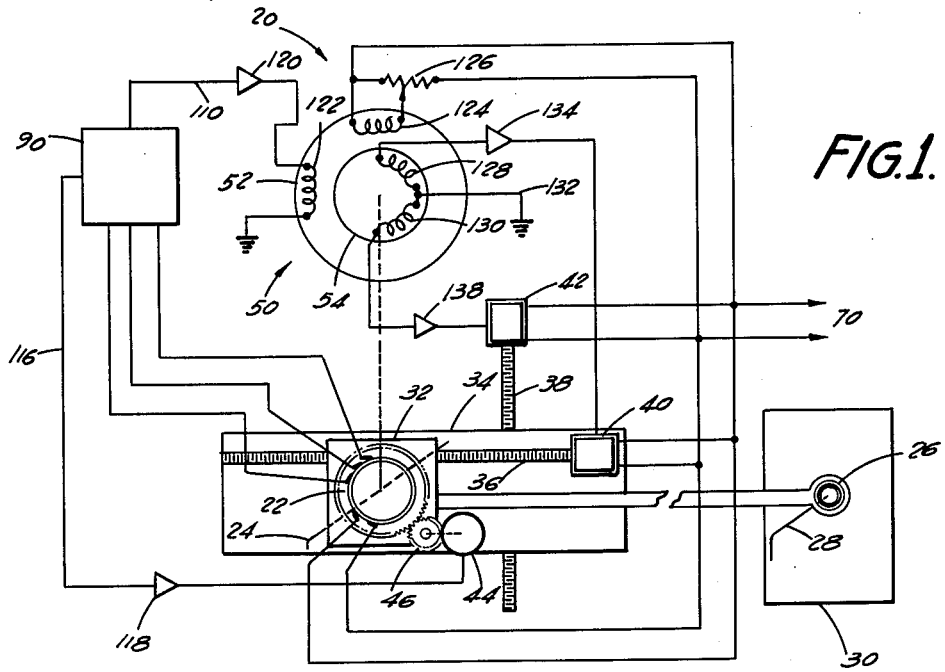
FIG. 1 is a schematic of a line tracing system utilizing the teachings of this invention.

Referring now to one embodiment of the invention, FIG. 1 shows a line tracing system 20 comprising a sensing head 22 following a line 24 and causing a work tool 26 such as a gas torch or the like to cut a similar line 28 in a work piece 30. The sensing head 22 is rotatably mounted on a carriage 32 which is longitudinally translatable along a second carriage 34. The carriage 34 is translatable in a direction perpendicular to the direction of translation of carriage 32. The carriages 32 and 34 are propelled by means of lead screws 36 and 38 respectively, driven by servo motors 40 and 42, respectively, which are energized by electric circuits hereinafter described.

The sensing head 22 may be rotatably driven by a servo motor 44 through an idler gear 46 which is in engagement with a drive gear 48 fixed to the sensing head 22. A rotary transformer or resolver 50 has a fixed stator 52 and a rotor 54 which is directly connected to the sensing head 22 to rotate therewith. The function of the resolver 50 will be described later with respect to the electric circuitry.

The sensing head 22 schematically shown in FIGS. 2 and 2a comprises a fixedly mounted photocell 56 upon which an image of the line 24 is projected by a lens 58. The image on the photocell 56 is caused to be periodically obstructed by a vibrator mechanism 59 comprising an arm 60 having a shutter portion 62. The arm 60 is attached at its mid-portion to a flat spring 64, having its ends 66 fixedly mounted within the sensing head. The arm 60 is permanently magnetized or may have a permanent magnet attached thereto which is in proximity with the magnetic field of an electromagnet 68. The electromagnet is energized by an alternating current source 70 to produce an alternating magnetic field which interacts with the magnetic field of the permanent magnet on the arm 60 to cause the arm to vibrate about the longitudinal axis of the flat spring 64. The shutter portion 62, therefore, vibrates across the optical axis between the photocell 56 and the lens 58 to periodically obstruct the image on the photocell. For detail as to the actual construction of the sensing head 22, reference is made to my copending application hereinbefore cited.

Figure 3:
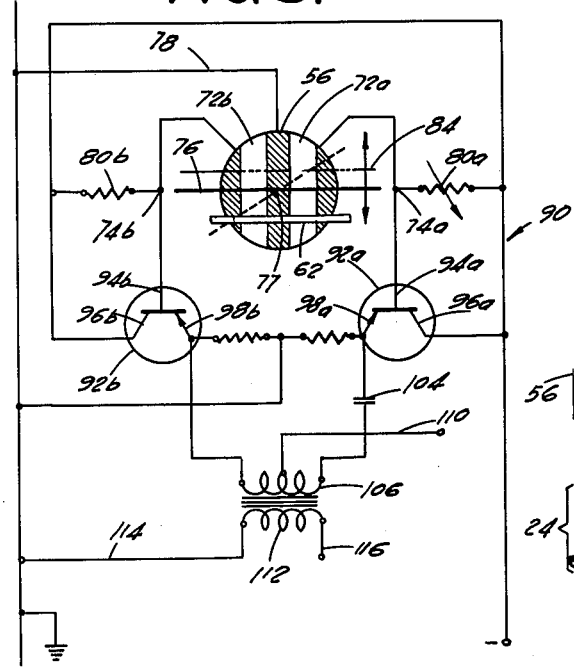
FIG. 3 is a schematic drawing of the photocell and vibrating shutter of one embodiment and the electric circuitry therefor.

The photocell 56 is of a special dual type having two photosensitive areas 72a and b with a separate output 74a and b related to each sensitive area as shown in FIGURE 3. The sensitive areas 72a and b are aligned parallel to one another and transversely to the front-to-back axis 76 of the sensing head 22 which passes through the midpoint 77 between the two sensitive areas. The shutter 62 in this embodiment is maintained in a direction aligned with the front-to-back axis 76 and is caused to vibrate in a direction perpendicular to the front-to-back axis.

A photoresistive type photocell is shown in FIGURE 3 which operates as two separate photocells associated with each of the photosensitive areas 72a and b. It is to be understood that any other photocell type either of dual construction or employing two elements may be adapted for use in this invention. The sensitive areas 72a and 72b have a common ground connection 78 and each is connected through a resistor 80a or b to a negative D.C. source. The resistor 80a is variable to provide means for balancing the output signals. The remainder of the circuit of FIGURE 3 will be hereinafter described.

Figure 4:
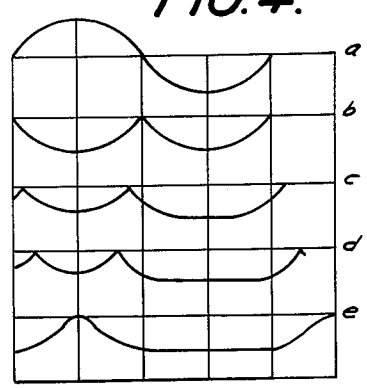
FIG. 4 is a graph showing displacement and voltage wave forms at the output of the sensing head.
Figure 4A:
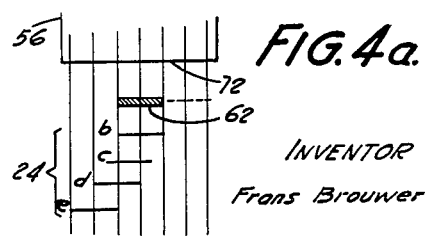
FIG. 4a is a schematic showing the geometric relationship of parts of the sensing head which correspond to the curves of FIG. 4.

FIGURE 4 shows an example of the kinds of signals that will appear on one of the outputs 74a or b of the photocell. In this case it is assumed that the width of the projected line 24 is approximately equal to the width of the shutter 62 and the width of the sensitive area 72 is larger than three times the width of the shutter 62 as shown in FIGURE 4a. The amplitude of vibration approximately equals the width of the projected line 24. The top curve a in FIGURE 4 shows the shutter amplitude versus time, and, as may be expected, the relationship is sinusoidal. Curves b, c, d, and e are voltage versus time representations. Curve b shows the signal on the photocell when the projection of the line 24 is central, which coincides with the shutter 62 in the condition when the vibrator is not operating. Curves c, d and e show the signals when the line projection is off center by, respectively, ¼, ½ and 1 width of the shutter 62.

These graphs may readily be derived by considering the geometry of this example. For example in curve b of FIGURE 4, representing the case where the line 24 is located centrally beneath the sensitive area 72, the light intensity impinging on the sensitive area 72 is greatest when the shutter 62 is also centrally located beneath the sensitive area. The resistance of the photocell will have its smallest value and the voltage at the output 74 will swing towards the ground potential. As the shutter 62 moves away from the centermost position it blocks out an increasing portion of the light impinging on the area 72 causing the resistance of the photocell to increase and hence causes the voltage at point 74 to swing more negative.

If the frequency of vibration is $f$ we see that the fundamental component in signal b is $2f$. However curves c, d, and e exhibit increasing content of the original frequency $f$. This component is in phase with the vibration frequency when the deviation of the projection from the center is in the direction shown in FIGURE 4a and in the opposite phase when the deviation is in the opposite side of the center. When the line is absent no fluctuation appears in the output of the photocell because the light intensity appearing on the sensitive area is constant.

The output signal from each sensitive area will, therefore, contain information as to the direction and magnitude of the transverse deviation of its midpoint from the projected image of the line. It will be noted that these signals may be combined and that the resultant signals will contain information as to the geometric position of the midpoint 77 between the two photosensitive areas 72a and b. In the embodiment shown in FIG. 3 the resultant signal representing the algebraic sum of the two outputs will be proportional to the transverse deviation of the midpoint 77. The resultant signal representing the algebraic difference of the two outputs will be proportional to the angular deviation from the front-to-back axis 76 of the sensing head 22 from the tangent to the line opposite the midpoint 77.

If the line is parallel to but displaced from the front-to-back axis 76 as shown at 84 in FIGURE 3, the fundamental frequency components of the signals at each of the outputs 74a and 74b will be identical in phase and magnitude. The sum of these two components when added together will be proportional to the deviation of the midpoint 77 from the projected image of the traced line. The algebraic difference of the two components will, of course, be zero, and this will indicate that the front-to-back axis 76 is parallel to the line. If, however, the line is at an angle to the front-to-back axis 76 and intersects the front-to-back axis at the midpoint 77, it will be seen that the fundamental frequency components of the outputs at 74a and 74b will be equal in amplitude but opposite in phase to one another. Thus the algebraic sum of the two signals will be zero and the algebraic difference will be proportional to the angular deviation of the front-to-back axis 76 from the line.

The signals from the outputs 74a and b of the photocell 56 are algebraically added and subtracted in an addition and subtraction circuit 90 shown in FIGURE 3. It comprises a pair of identical transistors 92a and b having their respective bases 94a and b connected to the photocell outputs 74a and b. Their collectors 96a and b are connected to the negative D.C. power source and their emitters 98a and b are connected together through a series arrangement of equal resistors 100a and b. The connection between the two emitter resistors 100a and b is applied to ground potential through line 102. The emitter 98a of the transistor 92a is also connected through condenser 104 to one side of the primary winding 106 of transformer 108. The emitter 98b of transistor 92b is connected directly to the other side of primary winding 106. The condenser 104 isolates the emitters 98a and b which would otherwise interact through the relatively low resistance of the primary winding 106. It is therefore obvious that the line 110 connected to the center tab of the primary winding 106 carries a signal which is proportional to the algebraic sum of the separate signals from the photocell 56. It is also obvious that the secondary winding 112 one side of which is grounded by line 114 provides a signal at line 116 which is proportional to the algebraic difference of the two outputs of the photocell 56.

Referring again to FIGURE 1, the difference signal is carried from the addition and subtraction circuit 90 through line 116 to a standard amplifier 118 whose output is connected to the servo motor 44 which rotates the sensing head 22. The motor 44 rotates the sensing head until its front-to-back axis is parallel with the line, at which time the difference signal will fall to zero. The algebraic sum signal is carried on line 110 to standard amplifier 120 whose output is connected to one primary winding such as winding 122 in the stator 52 of the resolver 50. The other primary winding 124 which is in quadrature with 122, is connected through an adjustable voltage divider 126 to the A.C. source 70. It is to be noted that the winding 124 is preferably energized by the same A.C. source energizing the vibrator assembly. However, separate sources may be used if properly phase oriented.

The rotor 54 of the resolver 50 has two secondary windings 128 and 130 arranged in quadrature and mounted in inductive relationship with the stator windings 122 and 124. The secondaries 128 and 130 are commonly connected to ground by line 132. The nongrounded end of secondary winding 128 is connected to amplifier 134 whose output provides a driving signal for servo motor 40 to drive the carriage 32 and sensing head 22 back and forth on the carriage 34. This direction of movement will hereinafter be referred to as along the "X" coordinate. The nongrounded end of secondary rotor winding 130 is connected to amplifier 138 whose output supplies a driving signal for servo motor 42 to translate the carriage 34 mounting the carriage 32 and sensing head 22. The motor 42 therefore drives the sensing head along what will be hereinafter referred to as the "Y" coordinate.

In the described embodiment the stator windings 122 and 124 are the primary windings and rotor windings 128 and 130 are the secondary windings. It is to be understood, however, that the rotor windings may be utilized as primary windings and the stator windings as secondary windings if so desired.

It will be observed that the "X" and "Y" axes remain stationarily oriented with respect to the line in the pattern. The rotor 54 of the resolver 50 is rotatable with the sensing head and, therefore, coordinates the algebraic sum signal with the actual orientation of the front-to-back axis of the sensing head. The output of the resolver is properly broken up into "X" and "Y" coordinate signals to drive the "X" and "Y" servos accordingly.

Having described one embodiment of the invention, a description of its operation will follow. The sensing head 22 is placed over the surface containing the line 24 and the work tool 26 rigidly connected thereto is thereby placed over the work piece 30. The sensing head is directed towards the line 24 until an image of the line appears on the sensitive areas 72a and b. If the line is parallel to the front-to-back areas of the sending head 22 the transistors 92a and b conduct equally to provide a fundamental frequency sum signal proportional to the transverse deviation of the front-to-back axis from the line. There will be no difference signal, however, to indicate angular deviation.

If the line is at an angle to the front-to-back axis the transistors 92a and b will conduct unequally and, therefore, produce a difference signal. The difference signal will energize the servo motor 44 to rotate the sensing head 22 until the line traced and the front-to-back axis are aligned. If there is a deviation of the line from the front-to-back axis, the sum signal will have a phase and amplitude which is indicative of the direction and amount of the deviation. The sum signal is transmitted to the resolver 50 wherein it is broken up into "X" and "Y" component signals to be fed to the "X" and "Y" servo motors. These motors operate to rotate the lead screws 36 and 38 respectively to translate the carriages 32 and 34 in the required directions. The resultant direction of the sensing head 22 is, therefore, precisely along the line 24 to be traced and the work tool 26 follows a similar path to cut the work piece 30 accordingly.

Reference is now made to FIGURES 5 and 6 which show another embodiment of this invention using the same type of photocell 56 having two parallel sensing areas 72a and b. In this configuration the shutter portion 136 forming a part of the vibrating arm 38 is caused to vibrate angularly about an axis through the point 77 on the front-to-back axis 76 of the sensing head midway between the two sensing areas 72a and b. The vibrating arm 138 vibrates about an axis described by the longitudinal axis of flat spring 142 having fixed ends 144. A permanent magnet 146, connected to the flat spring 142 adjacent its midpoint interacts with the alternating magnetic field of an electromagnet 148 causing the magnet to be alternately attracted to the opposite poles in phase with the alternating current applied thereto in the same manner as in the first described embodiment.

Now the functions of the sum and the difference signals are interchanged. The sum of the fundamental frequency components is now indicative of the amount of angular deviation of the front-to-back axis 76 from the tangent to the line. The difference signal is now indicative of the transverse deviation of the point 77 from the line. The circuitry for this embodiment may be the same as that used for the first embodiment except the sum signal would be transmitted to the rotation motor 44 and the difference signal would be transmitted to the stator primary winding in the resolver 50.

There are many other modifications which may be made to the embodiments shown herein which would still be within the teachings of this invention. For instance, the photocell could be mounted on the vibrating arm and caused to vibrate in a direction transverse to the front-to-back axis of the sensing head. The photocell in this arrangement would also provide sum and difference signals which would relate to the transverse and angular deviations of the line from the front-to-back axis. Another possible configuration would be to have the photocell on an arm which angularly vibrates much in the manner of the vibrating arm 138 in FIG. 5. It is also possible to mount the photocell in a mechanism which would cause the image to continuailly rotate about an axis intersecting the front-to-back axis at the mid-point between the two sensitive areas. This could be accomplished by, either mechanically rotating the photocell with respect to the image, or rotating the image (e.g. by revolving prisms) with respect to the photocell.

In view of the many embodiments and modifications thereto, it is the intention of the inventor not to be limited by the disclosed embodiments of this specification, but to be limited only by the scope of the appended claims.

What is claimed is:

1. In a system for scanning a line, a sensing head comprising photosensitive means having a plurality of sensitive areas, said photosensitive means positioned to have an image of a different segment of the line cast on each of said sensitive areas, an opaque shade disposed between said sensitive areas and said line, means for causing relative oscillating movement between said sensitive areas and said opaque shade and means for resolving the output signals from said photosensitive means into resultant signals indicative of the angular and transverse deviations of the sensing head from the image of the line.

2. In a system for scanning a line, a sensing head comprising photosensitive means having a plurality of sensitive areas, said photosensitive means positioned to have an image of the scanning field containing a different segment of the line cast on each of said sensitive areas, opaque means disposed between the sensitive areas and the line, means for oscillating said opaque means essentially transversely to the line for periodically obstructing the image of the line on the sensitive areas, and means for resolving the output signals from said photosensitive means into resultant signals indicative of the angular and transverse deviations of the sensing head from the image of the line said opaque means oscillated with equal amplitude across a plane perpendicular to said sensitive areas and containing the center of the scanning field.

3. A sensing head for a system for scanning a line comprising photosentitive means having a plurality of sensitive areas, each of said sensitive areas positioned to have an image of a different segment of the line cast simultaneously thereon, means for periodically affecting the receipt of the image of the line segment on each of said areas simultaneously when said line is aligned with the front-to-back axis of the sensing head and means for resolving the output signals from said photosensitive means into resultant signals indicative of the angular and transverse deviations of the sensing head from the image of the line.

4. In a system for scanning a line, a sensing head comprising photosensitive means having two elongated sensitive areas aligned parallel to one another, said photosensitive means positioned to have an image of a different segment of the line cast on each of said sensitive areas transverse to the areas' longest dimensions, opaque means disposed between said sensitive areas and the line, and means for oscillating said opaque means transversely to the line for periodically obstructing the image on the sensitive areas.

5. A system for scanning a line comprising a sensitive head, said sensing head comprising photosensitive means having a pair of sensitive areas, said photosensitive means positioned to have an image of a different segment of the line cast upon each sensitive area, each of said sensitive areas adapted to cause fluctuations in an electrical signal proportional to variations in light intensity, means for periodically interrupting the image of the line on each of said areas simultaneously when said line is aligned with the front-to-back axis of the sensing head, and means responsive to the fluctuations in the electric signal for determining the position and alignment of the scanned line with respect to the front-to-back axis of said sensing head.

6. The system as claimed in claim 5 wherein said interrupting means comprises an opaque shade oscillating with equal amplitude across a plane containing the front-to-back axis of said sensing head.

7. A system as claimed in claim 5 wherein said interrupting means comprises an opaque shade oscillating about an axis positioned within a plane perpendicular to and intersecting said sensitive areas at the midpoints thereof.

8. The system as claimed in claim 7 wherein the axis of oscillation is also parallel to the plane of said sensitive areas.

9. The system as claimed in claim 7 wherein the axis of oscillation is also perpendicular to and intersects the plane of said sensitive areas at a point midway between said sensitive areas.

10. The system as claimed in claim 5, wherein said determining means comprises a circuit for algebraically adding the electric signals and a circuit for algebraically subtracting the electric signals, whereby the output signals of said circuits are proportional to the displacement and the angular direction of the front-to-back axis from the line.

11. The system as claimed in claim 8 wherein said determining means comprises an electric circuit for algebraically adding the electric signals and an electric circuit for algebraically subtracting the electric signals, whereby the output signals of said circuits are proportional to the displacement and the angular deviation, respectively, of the line from the front-to-back axis.

12. The system as claimed in claim 9 wherein said determining means comprises an electric circuit for algebraically subtracting the electric signals and an electric circuit for algebraically adding the electric signal, whereby the output signals of said circuits are proportional to the displacement and the angular deviation, respectively, of the line from the front-to-back axis.

13. In a system for scanning a line, a sensing head comprising photosensitive means having a plurality of sensitive areas, said photosensitive means positioned to have an image of a different segment of the line cast on each of the sensitive areas, means for simultaneously modulating the images cast on said sensitive areas to produce fluctuating output signals therefrom, and means for resolving the output signals from said photosensitive means into resultant signals indicative of the angular and transverse deviations of the sensing head from the image of the line.

14. A system for tracing a pattern line comprising a rotatable sensing head having a front-to-back axis, said sensing head comprising photosensitive means having a plurality of sensitive areas, means projecting an image of a different segment of the pattern line upon each of the sensitive areas, means for simultaneously modulating said images cast on said sensitive areas at a predetermined frequency to produce fluctuating output signals therefrom, means for rotating said sensing head with respect to said pattern line, coordinate drive means for translating said sensing head with respect to said pattern line, a resolver for energizing said coordinate drive means, means providing a first drive signal of said predetermined frequency and phase connected to said resolver for energizing said coordinate drive means to drive said sensing head in a forward direction at a constant speed, means for producing a signal proportional to the algebraic sum of said fluctuating outputs, means for producing a signal proportional to the algebraic difference of said fluctuating outputs whereby the predetermined frequency components of one of said sum and difference signals is indicative of the angular displacement of the front-to-back axis of the sensing head from the pattern line and the other of said sum and difference signals is indicative of the transverse displacement, means responsive to one of said sum and difference signals for energizing said rotating means to angularly align said front-to-back axis with the segments of the line being sensed, and means responsive to the other of said sum and difference signals for providing a positional signal to said resolver to positionally align said front-to-back axis with respect to the segments of the line being sensed.

References Cited by the Examiner

UNITED STATES PATENTS

| | | | |
|---|---|---|---|
| 2,419,641 | 4/41 | Hart | 250—202 X |
| 2,489,305 | 11/49 | McLennon | 250—202 |
| 2,999,938 | 9/61 | Hann et al. | 250—202 |

RALPH G. NILSON, *Primary Examiner.*

RICHARD M. WOOD, WALTER STOLWEIN,
*Examiners.*